United States Patent

Shapiro

[11] 4,054,706
[45] Oct. 18, 1977

[54] LINING MATERIAL FOR FOOT WEAR AND A METHOD FOR MANUFACTURING SAME

[75] Inventor: Marvin Shapiro, Brooklyn, N.Y.

[73] Assignee: Continental Combining Corporation, Brooklyn, N.Y.

[21] Appl. No.: 581,535

[22] Filed: May 28, 1975

[51] Int. Cl.² .................................................. B32B 3/26
[52] U.S. Cl. .................................... 428/213; 156/82; 36/44; 428/315; 428/327; 428/425
[58] Field of Search .................. 156/82; 260/2.5 AK; 428/304, 305, 306, 315, 327, 425, 310, 213; 36/44, 43

[56] References Cited

U.S. PATENT DOCUMENTS

| | | | |
|---|---|---|---|
| 2,878,153 | 3/1959 | Hackländer | 428/315 |
| 3,057,766 | 10/1962 | Dickey | 156/82 |
| 3,072,582 | 1/1963 | Frost | 156/78 |
| 3,158,529 | 11/1964 | Robitschek et al. | 156/79 |
| 3,454,449 | 7/1969 | King | 156/82 |
| 3,497,416 | 2/1970 | Critchfield et al. | 428/315 |
| 3,616,029 | 10/1971 | Lerman | 428/315 |
| 3,817,818 | 6/1974 | Riding et al. | 428/315 |
| 3,954,537 | 5/1976 | Alfter et al. | 428/315 |

FOREIGN PATENT DOCUMENTS

| | | | |
|---|---|---|---|
| 1,351,246 | 12/1963 | France | 46/158 |

Primary Examiner—William J. Van Balen
Attorney, Agent, or Firm—Hopgood, Calimafde, Kalil, Blaustein & Lieberman

[57] ABSTRACT

A multilayer material includes a first layer of polyether foam or polyurethane foam, a second layer of a woven or knitted material adherent to a first surface of the first layer, and a third layer of a reprocessed foam material, consisting of flakes of polyether, polyurethane or both within a polyether linking agents or a polyurethane linking agent, adherent to the second surface of the first layer.

10 Claims, 2 Drawing Figures

LINING MATERIAL FOR FOOT WEAR AND A METHOD FOR MANUFACTURING SAME

BACKGROUND OF THE INVENTION

The invention relates to lining material for footwear and particularly to a multilayered material usable for the insole of footwear. Such a material should be dense enough to provide support for the foot, resilient enough to cushion the impact of the foot on the ground, absorbent enough to soak up perspiration and durable enough to provide long service. These qualities are particularly important in footwear which is intended to be utilized primarily in sports activities.

The resiliency may be provided by a layer of polyether foam or polyurethane foam but these materials lack the requisite absorbency. The addition of a layer of fabric such as cotton drill, on the foam layer will provide absorbency but polyether foam or polyurethane foam are not dense enough to provide the necessary support for footwear insoles.

Reprocessed polyether foam or polyurethane foam includes a number of flakes of recycled or reconstituted polyether, polyurethane or both bonded into a solid resilient mass within a polyether linking agent or a polyurethane linking agent. If such reprocessed foam is used rather than virgin polyether foam or polyurethane foam material the resulting foam layer will have increased density and will provide adequate support and resiliency. Reprocessed foam is also less costly than virgin material making the resulting liner material less expensive to manufacture. It has been found, however, that reprocessed foam material has two undesirable features which make it unsuitable for use in this application. First, the hard flakes of recycled material included within the reprocessed foam would create discomfort and would provide a source of possible irritation to the wearer's foot, if used in lining material for shoes. Secondly, the reprocessed foam may include material which is not flame laminable so that it could not be attached to cotton drill by the flame lamination technique which would be most advantageous for this purpose.

In order to overcome these difficulties and provide a superior material for lining footwear utilizing inexpensive reprocessed foam, applicant provides a novel layered material as described more fully below.

SUMMARY OF THE INVENTION

A multilayer material including a first layer of polyether foam or polyurethane foam; a second layer of a woven or knitted fabric material adherent to a first surface of the first layer; and a third layer of a reprocessed foam material, consisting of flakes of polyether, polyurethane or both within a polyether linking agent or a polyurethane linking agent, adherent to the second surface of the first layer and a method of making such a material.

DESCRIPTION OF THE INVENTION

Figure 1:
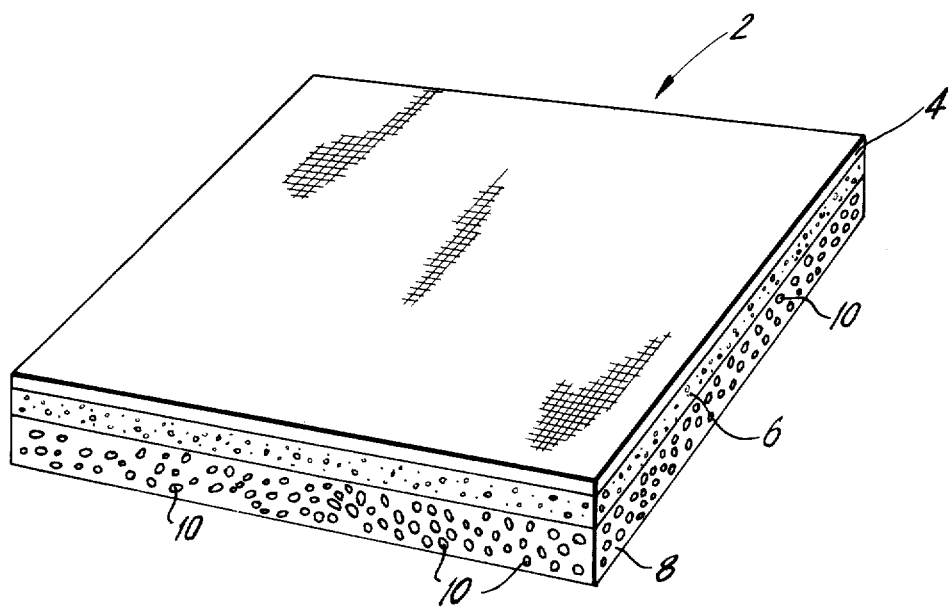
FIG. 1 is a prospective view showing the multilayer material of this invention.

FIG. 1 shows a rectangular piece 2 of the inventive multilayer material. The material includes a facing layer of fabric 4 of a woven or knitted material, which may be cotton drill, a layer of polyether foam or polyurethane foam 6 which is laminated to layer 4 and a layer 8 of a reprocessed foam material, including recycled flakes 10 of polyether, polyurethane or both within a polyether linking agent or a polyurethane linking agent, which is laminated to layer 6. Preferably the polyether foam or polyurethane foam material of layer 6 is chosen to be flame laminable.

The recycled flakes 10 of polyether and/or polyurethane, present in the reprocessed foam layer 8, are of varying hardness. Because of the presence of these flakes 10, the layer 8 of reprocessed foam has greater density than a layer of virgin polyether foam or virgin polyurethane foam of equal thickness. The density of the reprocessed material is a function of the type and numbers of flakes 10 which it includes. The flakes 10 create localized hard areas in the otherwise resilient layer of reprocessed foam, since they are harder than the polyether linking agent or the polyurethane linking agent.

The intermediate layer 6 of virgin polyether foam or virgin polyurethane foam acts to cushion the relatively hard flakes 10 of the layer 8 of reprocessed foam, so that they are not felt by a person's foot resting of fabric layer 4. In addition the fabric layer 4 cannot directly heat laminated onto the layer of reprocessed foam 8 since this layer may include material which is not flame laminable but both the fabric layer 4 and the reprocessed foam layer 8 can be heat laminated to the virgin foam layer 6, if such layer is composed of flame laminable polyether foam or polyurethane foam. By heat laminating layers 4 and 8 respectively to the opposed sides of layer 6 a three layer laminate material is formed which will provide support as a result of the density of the reprocessed foam material of layer 8, absorbency as a result of the fabric layer 4 and cushioning and additional resiliency as a result of the intermediate layer 6 of virgin polyether foam or polyurethane foam. Layers 4 and 8 may be firmly flame laminated to layer 6 to provide a strong material which is durable and resists delamination even under hard use in the manner described below. If desired a wet laminating process utilizing a suitable adhesive, such as latex, or polyurethane can be used to connect layers 4, 6 and 8, rather than flame lamination.

The lining material of FIG. 1 can be made utilizing a layer of reprocessed foam 8 of between 1/32 inch and ¼ inch in thickness in which the reprocessed foam material has a density within the range of 5 to 11 pounds per cubic foot, a layer 6 of polyether foam or polyurethane foam of between 1/32 inch to ¼ inch in thickness depending on the desired cushioning and a layer 4 of cotton drill having a count of 60 × 48 threads per square inch and a weight of 2.2 to 2.25 pounds per cubic yard. A material such as shown in FIG. 1 having a total foam thickness of 3/16 inch, ⅛ inch of which is in the reprocessed layer 8 and 1/16 on an inch is in the foam layer 6, has been found to provide a superior material. The preferred density of the reprocessed foam material of layer 8 is 8 pounds per cubic foot.

Figure 2:
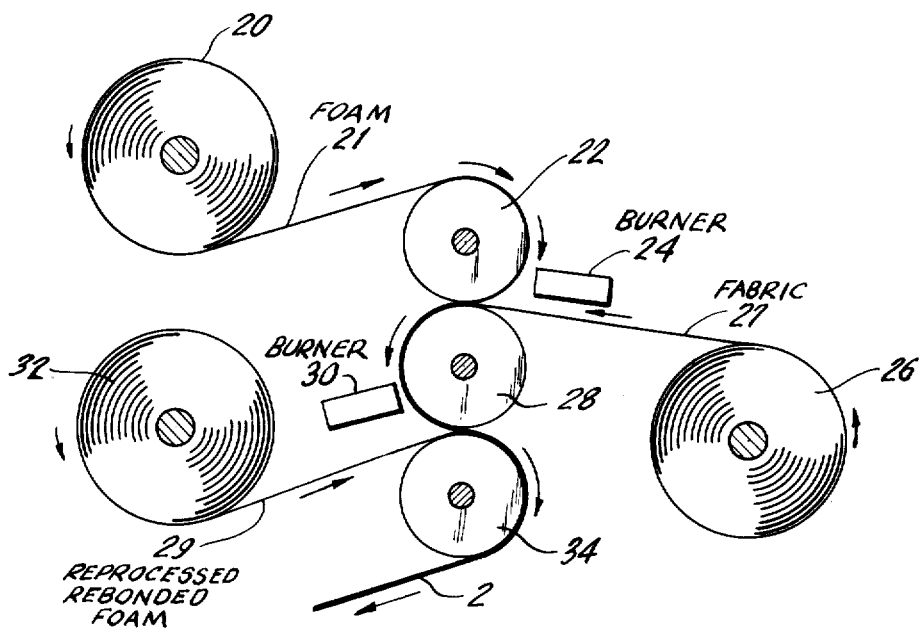
FIG. 2 is a schematic drawing illustrating a method of manufacturing the multilayer material of FIG. 1.

FIG. 2 illustrates a flame laminating process whereby the material of FIG. 1 may be manufactured utilizing a single pass through laminating machinery. A web 21 of polyether foam or polyurethane foam such as that described above with reference to layer 6 of FIG. 1 is coiled about a spool 20 and passes from spool 20 around roller 22 where a first of its surfaces is heated by burner 24 causing the polyether foam or the polyurethane foam adjacent to the surface to be liquified. A web 23 of a suitable woven or knitted fabric, such as the cotton drill described with reference to layer 4 of FIG. 1, is coiled about spool 26. The fabric web 23 passes from spool 26 between rollers 22 and 28 where it is pressed firmly into contact with the heated liquified surface of the foam web 21 causing the fabric web 23 and the foam web 21 to be firmly laminated together. This laminated material then passes around roller 28 where a second surface of the foam web 23 is heated by burner 30 and the material adjacent to its second surface is liquified. A web of reprocessed foam 29 which includes either polyether flakes or polyurethane flakes and is described above with reference to layer 8 of FIG. 1, is coiled about spool 32 and is passed from spool 32 between the rollers 28 and 34 where it is pressed firmly into contact with the liquified second surface of the foam web 21 firmly laminating the reprocessed foam web 29 to the second side of the virgin foam web 21 thereby completing the three layer laminated material 2 as illustrated in FIG. 1. The material 2 is then coiled around a futher spool for storage or is passed through additional machinery where it is cut into desired shapes.

Burners 24 and 30 may be gas burners of the type known in the art which apply heat to the two respective opposed surfaces of the polyether foam or polyurethane foam so that the polyether foam material or polyurethane foam material becomes liquified adjacent to the heated surface. The liquid polyether or polyurethane on the surface of the foam web then acts as a bonding agent to bind the fabric 4 and the reprocessed foam 8 respectively to the opposed sides of the foam 6, to form the laminated material of FIG. 1.

If desired the two laminations described above can be done separately. The fabric web 23 can first be laminated to a first surface of the foam web 21 to form a two layer laminate in the manner described above. Then subsequently the reprocessed foam web 29 can be laminated to the second surface of the foam web 21 to form the completed three layer laminate.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. A multilayer material including a first layer having a first and a second surfaces of a foam material chosen from a group consisting of polyether and polyurethane;
    a second layer of a fabric material adherent to said first surface of said first layer; and
    a third layer of a reprocessed foam material, comprising flakes of a material chosen from a group consisting of polyether and polyurethane within a linking agent chosen from a group consisting of polyether and polyurethane, adherent to said second surface of said first layer.
2. A multilayer material as claimed in claim 1 in which said first layer is within the range of 1/32 inch to ¼ inch in thickness and said third layer is within the range of 1/32 inch to ¼ inch in thickness.
3. A multilayer material as claimed in claim 2 in which said first layer is approximately 1/16 inch in thickness and said third layer is ¼ inch in thickness.
4. A multilayer material as claimed in claim 1 in which said reprocessed foam has a density within the range of 8 to 11 pounds per cubic foot.
5. A multilayer material as claimed in claim 4 in which said reprocessed foam has a density of approximately 5 pounds per cubic foot.
6. A multilayer material as claimed in claim 1 in which said fabric material is a woven material.
7. A multilayer material as claimed in claim 1 in which said fabric material is a knitted material.
8. A multilayer material as claimed in claim 1 in which said fabric material is cotton drill.
9. A multilayer material as claimed in claim 4 in which said cotton drill has a count of approximately 60 × 48 threads per square inch and a weight within the range of 2.2 to 2.25 pounds per cubic foot.
10. A multilayer material including a first layer having a first and a second surfaces of a foam material chosen from a group consisting of polyether and polyurethane, said first layer being between 1/32 and ¼ inch in thickness;
    a second layer of an absorbent fabric material adherent to said first surface of said first layer; and
    a third layer of a reprocessed foam material having a density within the range of 8 to 11 pounds per cubic foot, said third layer comprising flakes of a material chosen from a group consisting of polyether and polyurethane within a linking agent chosen from a group consisting of polyether and polyurethane, adherent to said second surface of said first layer, and said third layer being between 1/32 and ¼ inch in thickness.

* * * * *